United States Patent
Cho et al.

(10) Patent No.: US 12,533,451 B2
(45) Date of Patent: Jan. 27, 2026

(54) AUGMENTATION OF MASS TRANSFER USING OSCILLATION

(71) Applicant: University of Pittsburgh—Of the Commonwealth System of Higher Education, Pittsburgh, PA (US)

(72) Inventors: Sung Kwon Cho, Pittsburgh, PA (US); Hongyao Geng, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 310 days.

(21) Appl. No.: 16/072,006

(22) PCT Filed: Jan. 22, 2017

(86) PCT No.: PCT/US2017/014481
§ 371 (c)(1),
(2) Date: Jul. 23, 2018

(87) PCT Pub. No.: WO2017/127777
PCT Pub. Date: Jul. 27, 2017

(65) Prior Publication Data
US 2019/0022294 A1    Jan. 24, 2019

Related U.S. Application Data

(60) Provisional application No. 62/281,859, filed on Jan. 22, 2016.

(51) Int. Cl.
*A61M 1/26* (2006.01)
*A61M 1/16* (2006.01)
(Continued)

(52) U.S. Cl.
CPC ............ *A61M 1/26* (2013.01); *A61M 1/1698* (2013.01); *B01D 53/228* (2013.01); *B01D 61/00* (2013.01);
(Continued)

(58) Field of Classification Search
CPC .................................................. A61M 1/1698
See application file for complete search history.

(56) References Cited

U.S. PATENT DOCUMENTS 4,620,965 A * 11/1986 Fukusawa ........... A61M 1/1698
422/46
4,770,675 A 9/1988 Kurzweg
(Continued)

FOREIGN PATENT DOCUMENTS

| JP | S6264374 A | * | 9/1985 | |
| JP | 2005030927 A | * | 2/2005 | ........ B01L 3/502707 |
| WO | WO2017127777 | | 7/2017 | |

OTHER PUBLICATIONS

Ryu et al., Micropumping by an Acoustically Excited Oscillating Bubble for Automated Implantable Microfluidic Devices, 15 JALA 163, 163-71. (Year: 2010).*

(Continued)

*Primary Examiner* — Magali P Slawski
*Assistant Examiner* — Bernadette Karen McGann
(74) *Attorney, Agent, or Firm* — BARTONY & ASSOCIATES, LLC

(57) ABSTRACT

A device hereof includes a first volume for flow of a first fluid therethrough, a second volume for flow of a second fluid therethrough, a membrane separating the first volume from the second volume, which is permeable to transfer/exchange of at least one component between the first volume (Continued)

and the second volume and a drive system or actuator system to induce oscillation in the membrane.

26 Claims, 8 Drawing Sheets

(51) Int. Cl.
  *B01D 53/22* (2006.01)
  *B01D 61/00* (2006.01)
  *B01D 63/00* (2006.01)
  *B01D 65/08* (2006.01)
  *B01D 71/70* (2006.01)

(52) U.S. Cl.
  CPC ............. *B01D 63/00* (2013.01); *B01D 65/08* (2013.01); *B01D 71/701* (2022.08); *A61M 2205/106* (2013.01); *A61M 2206/20* (2013.01); *B01D 2321/2058* (2013.01)

(56) References Cited

U.S. PATENT DOCUMENTS

| | | | |
|---|---|---|---|
| 4,770,786 A | 9/1988 | Manabe | |
| 7,981,368 B2* | 7/2011 | Laugharn, Jr. | G10K 15/00 366/108 |
| 8,734,382 B2* | 5/2014 | Frankowski | A61M 1/1678 604/23 |
| 2003/0175947 A1* | 9/2003 | Liu | B01L 3/50273 435/288.5 |
| 2004/0157093 A1 | 8/2004 | Mardilovich | |
| 2005/0098032 A1* | 5/2005 | Tsai | B01D 19/0031 95/46 |
| 2008/0142441 A1 | 6/2008 | Pashley | |
| 2008/0314820 A1 | 12/2008 | Prulhiere | |
| 2011/0290113 A1* | 12/2011 | Borenstein | A61M 1/1698 96/9 |
| 2015/0251141 A1* | 9/2015 | Mourad | B01D 71/56 210/636 |
| 2017/0100531 A1* | 4/2017 | Madhani | B01D 65/08 |

OTHER PUBLICATIONS

S. Daniels, T. Kodama, & D. J. Price, Damage to red blood cells induced by acoustic cavitation, 21 Ultrasound in Med. & Biol., 105, 105-111 (1995). (Year: 1995).*

Dolgin, E. Artificial inspiration, Nature, vol. 489, 2012, pp. S12-S14.

Potkay, J. A. The promise of microfluidic artificial lungs, Lab Chip, vol. 14, pp. 4122-4138, 2014.

Hattler, B.G. et al., A respiratory gas exchange catheter: In vitro and in vivo tests in large animals, J. Thorac. Cardiovasc. Surg., 2002, 520-530.

Hoganson, D. M. et al., Lung assist device technology with physiologic blood flow developed on a tissue engineered scaffold platform, Lab Chip, vol. 11, pp. 700-707, 2011.

Potkay, J. A. et al., Bio-inspired, efficient, artificial lung employing air as the ventilating gas, Lab Chip, vol. 11, pp. 2901-2909, 2011.

Kniazeva, T., et al., Performance and scaling effects in a multilayer microfluidic extracorporeal lung oxygenation device, Lab Chip, vol. 12, pp. 1686-1695, 2012.

Rochow, N. et al., An integrated array of microfluidic oxygenators as a neonatal lung assist devices: In vitro characterization and in vivo demonstration, Artificial Organs, vol. 38, pp. 856-866, 2014.

Robb, W.L. Thin Silicon membranes—Their permeation properties and some applications, Ann. N. Y. Acad. Sci., vol. 146, pp. 119-137, 1968.

B. Chang, et al., Low-height sharp edged patterns for capillary self-alignment assisted hybrid microassembly, J Micro-Bio Robot, 2014, 9:1-10.

Feng, J. et al., Micro propulsion in liquid by oscillating bubbles, presented at the 2013 IEEE 26th International Conference on Micro Electro Mechanical System (MEMS), Taipei, 2013, 63-66.

Feng, J. et al., Micropropulsion by an acoustic bubble for navigating microfluidic spaces, Lab Chip, vol. 15, pp. 1554-1562, 2015.

Feng, J. et al., Two-Dimensionally Steering Microswimmer Propelled by Oscillating Bubbles, presented at the 2014 IEEE 23rd International Conference on Micro Electro Mechanical Systems (MEMS), San Francisco, 2014, 188-191.

* cited by examiner

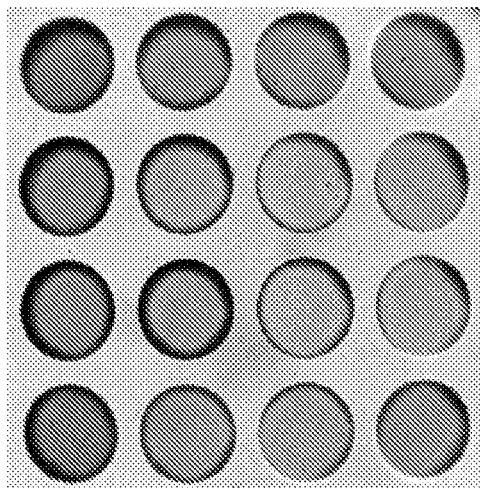
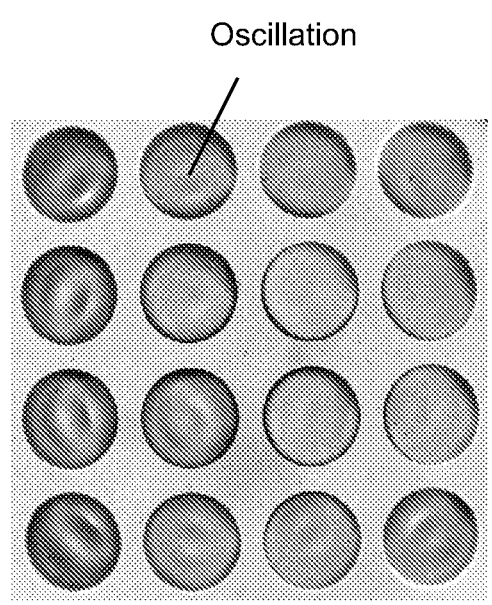
Fig. 7A
Fig. 7B
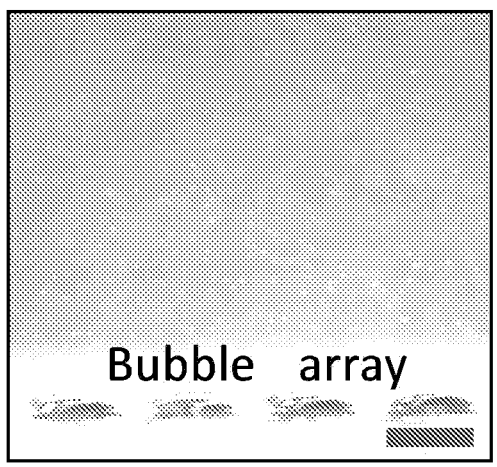
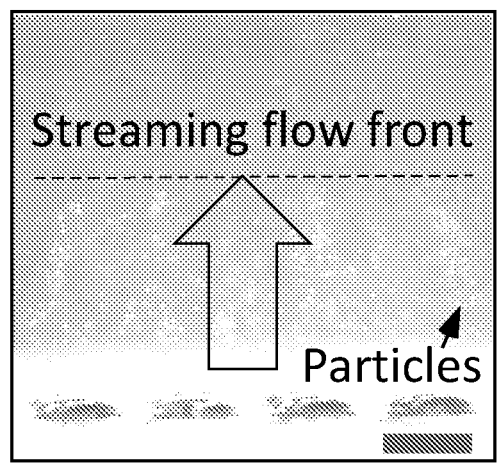
Fig. 7C
Fig. 7D

AUGMENTATION OF MASS TRANSFER USING OSCILLATION

CROSS-REFERENCE TO RELATED APPLICATIONS

This application is a national phase filing of PCT International Patent Application No. PCT/US2017/014481, filed Jan. 22, 2017, which claims benefit of U.S. Provisional Patent Application Ser. No. 62/281,859, filed Jan. 22, 2016, the disclosures of which are incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

Mass (for example, liquid and/or gas) exchange devices may, for example, include a fluid main stream, an intervening membrane through which one or more components (liquid or gas) is transferable (for example, a porous, permeable or semipermeable membrane) and a second fluid (liquid and/or gas) stream. The main stream is separated from the second stream by the intervening membrane, and mass exchange/transfer occurs between the two streams through the membrane. In such a configuration, a significant bottleneck in mass transfer arises from the extremely slow process of mass transport across the main flow stream, wherein the transport mechanism relies on a diffusion process driven predominantly by concentration gradient. Typically, the flow in the main stream includes a laminar boundary layer adjacent the membrane, which inhibits fast mixing and thus mass transport. This problem becomes more significant as the physical dimensions of the system become smaller. At smaller dimensions, the viscous effect becomes more dominant. A recent trend in devices for gas exchange for lung assist is, for example, to mimic human lung structures using micro-channels. The small dimensions of such micro-channels result in a laminar flow and thus significant inhibition to mass transport. Microchannels may, for example, have a dimension or hydraulic diameter of less than a few mm (for example, less than 2 mm). Typically, microchannels have a dimension of less than 1 mm. Many microchannels have a dimension in the range of hundreds of micrometers ($\mu m$; for example, 900 $\mu m$) to hundreds of nanometers (nm; for example, 100 nm).

SUMMARY

In one aspect, a device hereof includes a first volume for flow of a first fluid therethrough, a second volume for flow of a second fluid therethrough, a membrane separating the first volume from the second volume, which is permeable to transfer/exchange of at least one component between the first volume and the second volume and a drive system or actuator system to induce oscillation in the membrane.

In a number of embodiments, the drive system is adapted to induce oscillation in the membrane at a frequency of 100 Hz, 500 Hz, 1 kHz or higher (for example, at least 1 kHz, at least 3 kHz, at least 5 kHz, at least 7 kHz or at least 10 kHz). Typically, the oscillation amplitude is less than one millimeter. In a number of embodiments, the oscillation is in the range of several microns up several hundreds of microns, and depends upon the dimension of the volume (for example, channel/microchannel) in connection with which the membrane operates.

In a number of embodiments, the amplitude of oscillation is in the range of 1 to 30% of the dimension of the volume. In general, oscillation is used to generate microstreaming flows perpendicular to the main laminar liquid stream. The laminar flow stream thus experiences substantially increased mixing and mass exchange through the membrane. At low frequencies of oscillation, the boundary layer symmetrically and reversely oscillates or microstreaming therein is very weak. Increasing the frequency to, for example, the hundreds of Hz or kHz range result in breaking up of laminar flow by microstreaming flows, wherein the flow contains many vortices, which enhance mass transport across the boundary layer.

In a number of embodiments, the membrane includes a plurality of areas of reduced thickness. The plurality of areas of reduced thickness may, for example, include an array of recesses in the membrane. The membrane may, for example, have a thickness in the range of 1-50 $\mu m$, 1-30 $\mu m$, 1-25 $\mu m$, or 1-20 $\mu m$. The plurality of areas of reduce thickness may, for example, have a thickness in the range of 1- to 10 $\mu m$, 1- to 7.5 $\mu m$ or 1- to 5 $\mu m$.

In a number of embodiments, the membrane is adapted to form bubbles thereon. The membrane comprises areas of reduced thickness (for example, an array of recesses) thereon, wherein the areas of reduced thickness are adapted to form and/or entrap the bubbles thereon. The frequency oscillation may, for example, be in a range operable to form oscillations on the surfaces of the bubbles.

The at least one component may, for example, be a gaseous component. In a number of embodiments, the membrane is permeable to the component, which is a gas, and limits or prevents passage of the liquid therethrough.

The device may, for example, be an artificial lung, a fuel cell, a dialyzer, a membrane filter system, a heat exchanger system or a desalination membrane system (operating, for example, via reverse osmosis). In a number of embodiments, the device is an artificial lung and the first fluid is blood. The first volume is adapted for flow of blood therethrough. The device may, for example, include a plurality of volumes for flow of a second fluid comprising oxygen therethrough and a plurality of membranes. Each of the plurality of membranes separates the first volume from one of the plurality of volumes. The plurality of membranes may, for example, form hollow fibers which define the plurality of volumes therein. Each of the plurality of membranes may, for example, be formed of a hydrophobic material. In a number of embodiments, each of the plurality of membranes is formed as a hollow fiber.

In the representative or specific case of an artificial lung, the first fluid is a liquid (blood) and the second fluid is a gas comprising oxygen. As described above, however, devices, systems and methods hereof can enhance mass transport from one liquid and/or gas stream to another liquid and/or gas stream.

In another aspect, a method of exchanging at least one component (for example, a gaseous component or a liquid component) between a first fluid and a second fluid includes flowing the first fluid through a first volume, flowing the second fluid through a second volume wherein a membrane separates the first volume from the second volume, the membrane being permeable to exchange at least one component between the first volume and the second volume, and oscillating the membrane. The membrane may, for example, be formed and/or oscillated at a frequency as described above. Likewise, the membrane may be used in a number of devices or systems as described above.

The present devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 7A illustrates an enlarged view of air bubbles entrapped upon the recesses of the membrane.

FIG. 7B illustrates oscillation induced in air bubbles entrapped upon the recesses of the membrane.

FIG. 7C illustrates a photomicrograph of a side view of microchannel including particles in the fluid to assist in viewing flow streams and without oscillation of the membrane.

FIG. 7D illustrates a photomicrograph of a side view of microchannel including particles in the fluid to assist in viewing flow streams and with oscillation of the membrane to induce microstreaming flow.

DESCRIPTION

Figure 1:
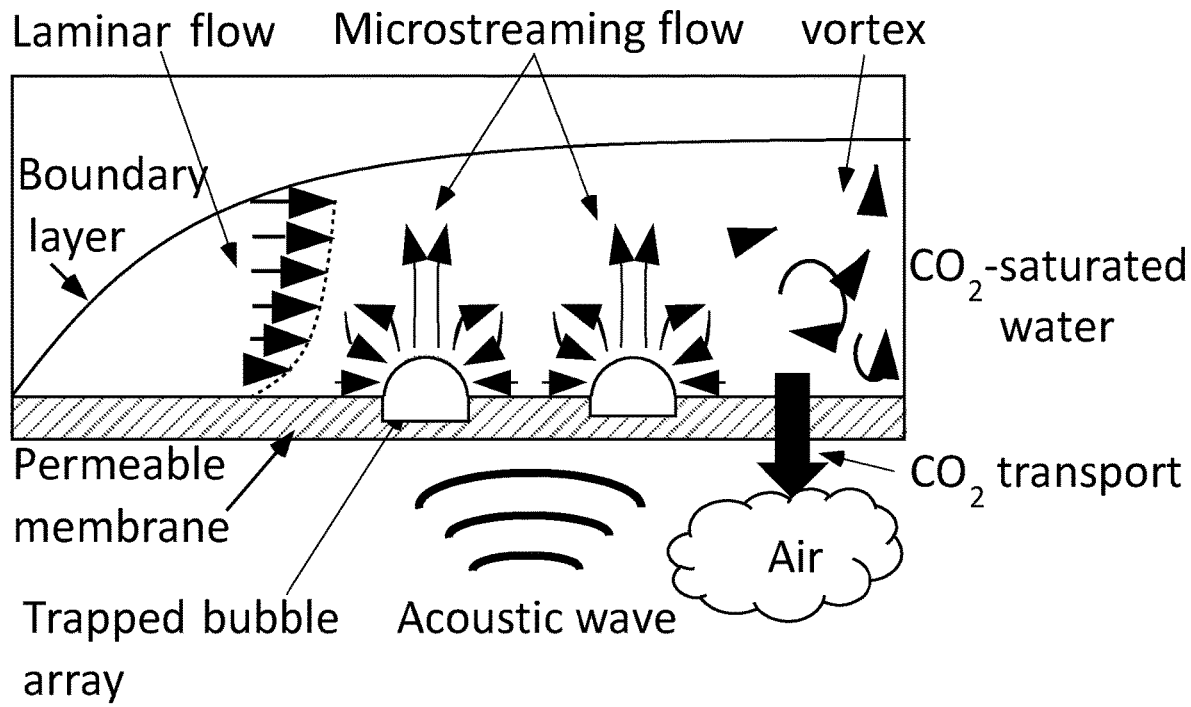
FIG. 1 illustrates an idealized representation of the use of an oscillating membrane including entrapped bubbles to induce microstreaming flow in a boundary layer adjacent the membrane.

The present devices, systems, and methods, along with the attributes and attendant advantages thereof, will best be appreciated and understood in view of the following description taken in conjunction with any accompanying drawings.

It will be readily understood that the components of the embodiments, as generally described and illustrated in the figures herein, may be arranged and designed in a wide variety of different configurations in addition to the described example embodiments. Thus, the following more detailed description of the embodiments hereof, as represented in the figures, is not intended to limit the scope of the embodiments, as claimed, but is merely representative of such embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a membrane" includes a plurality of such membranes and equivalents thereof known to those skilled in the art, and so forth, and reference to "the membrane" is a reference to one or more such membranes and equivalents thereof known to those skilled in the art, and so forth. Recitation of ranges of values herein are merely intended to serve as a shorthand method of referring individually to each separate value falling within the range. Unless otherwise indicated herein, and each separate value as well as intermediate ranges are incorporated into the specification as if it were individually recited herein. All methods described herein can be performed in any suitable order unless otherwise indicated herein or otherwise clearly contraindicated by the text.

In a number of embodiments, devices, systems and methods hereof enhance mass transfer across a membrane through which a component is transportable (for example, a porous, permeable or semipermeable membrane) via oscillation of the membrane. In general, the membrane is selected to be permeable to at least one component in at least one of the fluid streams on either side of the membrane. In a number of embodiments, the membrane may be adapted to form and/or entrap gas bubbles thereon in which a wave may be formed.

In a number of embodiment, to overcome mass transport limitation arising from boundary layers in mass exchange devices, a number of devices hereof utilize oscillation via at least one of two approaches: (1) oscillate the membrane using a pressure wave source (for example, a piezoelectric actuator) or (2) creating/embedding bubble arrays in/on the membrane and oscillate the bubble arrays (for example, using a pressure wave source). Oscillations on the membrane and/or bubbles generate strong cross flows (sometimes referred to as microstreaming) across (the direction of bulk flow in) the boundary layer in the main fluid stream. Such microstreaming significantly enhances flow mixing and brings highly-concentrated "fresh" fluid from the main fluid stream to the membrane surface. As a result, mass transfer/ exchange is significantly augmented.

Although applicable to any mass exchange device including an intervening/intermediate mass transport membrane or mass transfer membrane, in a number of representative embodiments hereof, oscillating membranes and/or oscillating bubble arrays on membranes are used in, for example, devices comprising microchannels such as lung assist devices or artificial lung devices. Such devices are use in oxygenation of blood and/or $CO_2$ removal from blood.

Gas transport in lung is between capillary and alveolus, driven by dissolved gas concentration gradient. The thin cell walls of alveolus and capillary separate the gas (air) and fluid (blood) phase. This process is efficient as a result of the microscale of the structures. For patients with lung failure, there is an urgent or chronical demand to oxygenate blood in vitro. An artificial lung may be used to provide blood with oxygen and remove carbon dioxide to replace the function of the lung. Artificial lungs have been an area of research in microfluidics. As used herein, the term "microfluidics" refers to the science and technology of manipulating and controlling fluids (for example, in the range of microliters to picoliters), in networks of channels having a lowest dimension typically less than 1 mm (for example, from 900 micrometers to 100 nanometers). Microfluidic gas exchangers typically include one or more very thin permeable membranes to mimic the cell walls in lung. A number of such gas exchangers include polymeric hollow fiber membranes such as polypropylene hollow fiber membranes. Recently, a polysiloxane, polydimethylsiloxane or PDMS, has been used to fabricate membranes. PDMS is highly permeable to gases as a result of its porosity (having permeability coefficients of 600 and 3250 Barrer for $O_2$ and $CO_2$, respectively). PDMS is also biocompatible with negligible toxicity. Moreover, PDMS is commonly used in microfabrication and is easy to control in molding processes to form structures of controlled configuration. PDMS membranes may be formed relatively thin to reduce the resistance against gas diffusion through such membranes. The thicknesses of PDMS membranes and other membranes hereof (for example, polymeric membranes) may, for example, be in the range of 1-50 μm, 1-30 μm, 1-25 μm or 1-20 μm, which almost reaches the limit for conventional microfabrication. However, a bottleneck in the gas exchange process is that the lateral mass transport in the boundary layer is known to be extremely low. The flow is laminar in microfluidics as a result of the small dimensions and flow rates. The slow diffusion mechanism and lack of advective crossstream ultimately retard the overall gas exchange in the system.

In a number of embodiments, devices, systems and methods hereof overcome the disadvantage of laminar flow in microfluidics by generating microstreaming flows which may be perpendicular to the main laminar liquid stream as schematically illustrated in FIG. 1. In a number of embodiments of devices hereof, a membrane such as a PDMS membrane can trap microbubbles (for example, thousands of microbubbles) automatically when a liquid stream passes. Upon oscillating and resonating the microbubble array along with the membrane (for example, using an external acoustic field) lateral flows are generated. The laminar flow is disturbed or broken up by such microstreaming flows. The microstreaming flow contains many vortices, which enhance mass transport across the boundary layer. To show the effect of this device, $CO_2$ was chosen as the exchanging gas. Fluid flowing on a first side of a gas permeable membrane is initially saturated by $CO_2$, while the other side of the membrane is exposed to air at room condition. $CO_2$ will transport through the membrane from high concentration to low concentration. The removal of $CO_2$ will be augmented upon bubble and/or membrane oscillation. The membrane serves as a mixer in addition its gas permeability. This microstreaming flows resulting from oscillation benefit the efficiency of, for example, artificial lungs, as well as other applications related to gas transport and fluid mixing.

As described above, one approach to enhance gas exchange in artificial lung is to reduce cross-dimensions using microchannels, which eventually increases the surface area in contact with blood flow. Such microchannels may, for example, have dimensions on the order of micrometers to millimeters. In a number of embodiments of mass transfer devices hereof, microchannels may, as described above, have dimensions on the order of hundreds of nanometers to millimeters, or hundreds of nanometers (for example, 100 nm) to hundreds of micrometers (for example, 900 μm). However, increasing contact areas in the case of artificial lungs may generate many problems (for example, activations of inflammatory response by increased surface, infection, clotting, etc.). The oscillatory systems hereof allow one to, for example, maintain physical cross-dimensions as much as that of conventional artificial lung devices, while significantly enhancing exchange rate. As a result, the overall device size can be reduced to, for example, facilitate use as a portable artificial lung device.

Figure 2:
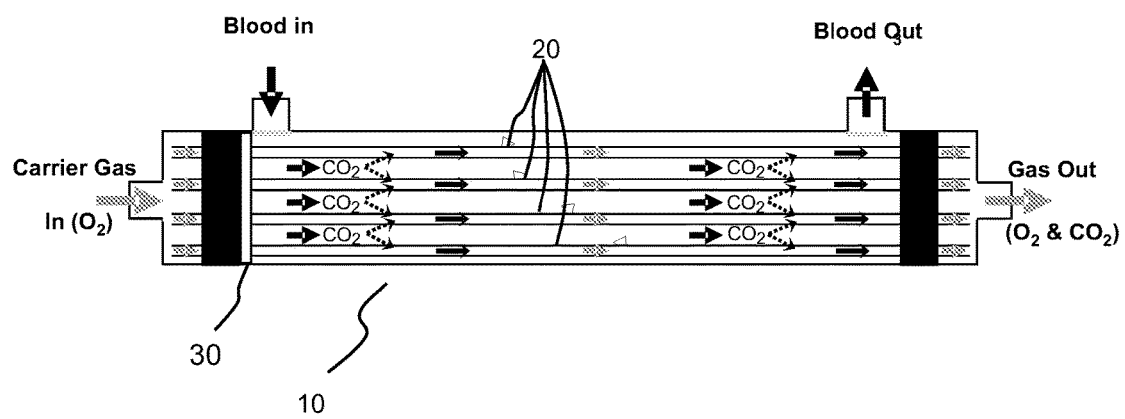
FIG. 2 illustrates the use of an actuator to induce oscillation hollow fiber tubing of an artificial lung device to increase mass transfer.

FIG. 2 illustrates an embodiment of a lung assist device 10 including a plurality of hollow gas permeable fibers 20 as known in the art. In device 10 illustrated in FIG. 2, blood flows through a first volume outside the hollow fibers. A carrier gas comprising oxygen flow through volumes defined by the lumens of the hollow fibers. Driven by concentration gradients, $CO_2$ transfers across the membranes of the hollow fibers for removal thereof from the blood, while oxygen transfers across the membranes of the hollow fibers for oxygenation of the blood. An actuator 30 (for example, a piezoelectric actuator) may, for example, be provided to induce oscillation in the hollow fibers to enhance gas transfer across the membranes of the hollow fibers.

Figure 3A:
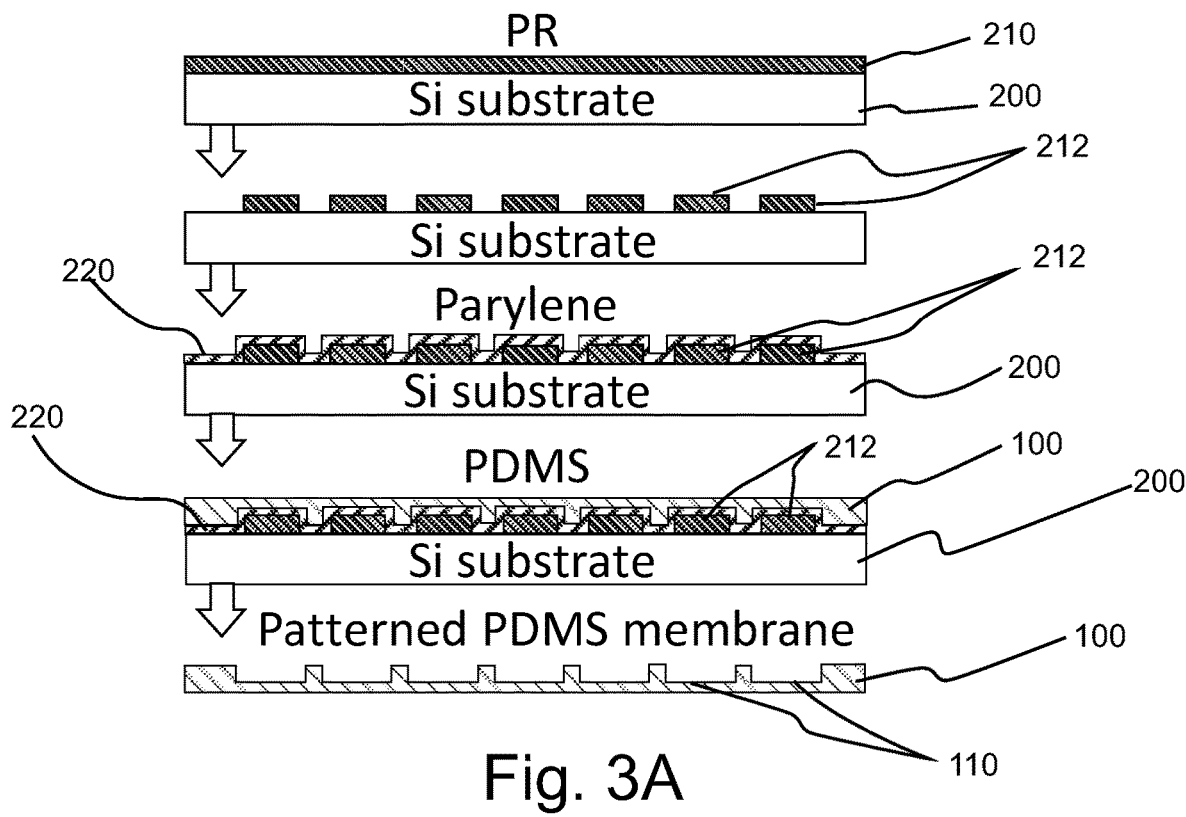
FIG. 3A illustrates a process for forming membranes having an array of recesses therein.

In a number of embodiments hereof, PDMS membranes 100 were fabricated which were included a plurality of or an array of depressions or recesses 110 (see FIG. 3A). Such recesses 110 or areas of reduced thickness enhance oscillation and may be used to trap and hold microbubbles. An example of a fabrication methodology for a representative PDMS membrane 100 is illustrated in FIG. 3A. In a number of studies, conventional photolithography was used for microfabrication. A thick AZ4620 photoresist (PR) layer 210 was formed upon a silicon (Si) substrate 200 by spin coating at 800 rpm for 45 sec. Subsequently, the PR layer 210 was patterned to include micropillars 212 (200-μm diameter and 17-μm height after development) for molding. The Si substrate was coated with primer to increase adhesion before the photoresist or PR coating, because it was difficult for micropillars 212 to survive subsequent processes of developing and deionized (DI) water cleaning without use of primer. Subsequently, a 1 μm-thick Parylene C layer 220 was deposited on the patterned substrate. This deposition was done by a chemical vapor deposition (CVD) process (using a PDS 2010 Labcoater, available from Cookson Electronics Company). Deposited Parylene C layer 220 was very uniform and pinhole free. Parylene layer 220 facilitates releasing of PDMS structure/membrane 100 later. The PDMS elastomer and curing agent (Sylgard 184 Silicone Elastomer Kit, available from Dow Corning) were mixed thoroughly at the weight ratio of 10:1, followed by degassing in vacuum.

Figure 3B:
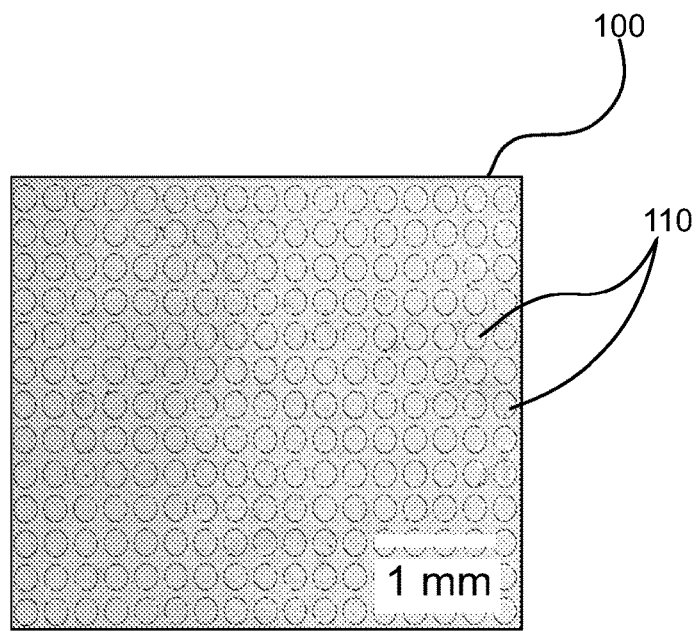
FIG. 3B illustrates a photomicrograph of an embodiment of a membrane hereof formed via the process of FIG. 3A.

The mixed PDMS was poured onto the mold and spin coated at 5000 rpm for 30 s. After PDMS membrane 100 was cured in an oven at 75° C. for 1 h, a 1×1 cm² piece was cut and peeled off. FIG. 3B illustrates a photomicrograph of fabricated PDMS membrane 100. The thickness of PDMS membrane 100 was 21 µm with 17 µm deep recesses 110.

Figure 4A:
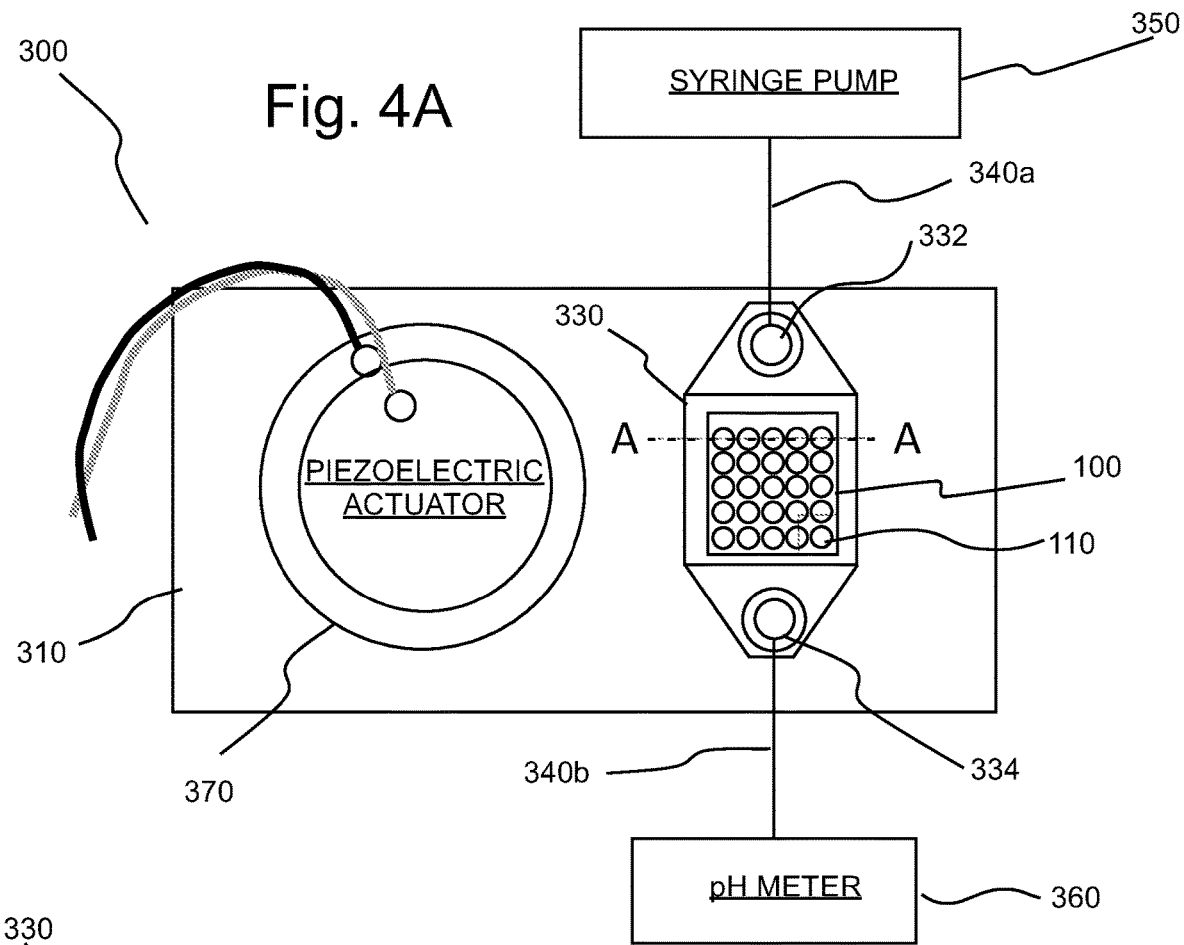
FIG. 4A illustrates a top view an embodiment of an experimental setup for studying an oscillating membrane hereof in a fluidic microchannel chamber.
Figure 4B:
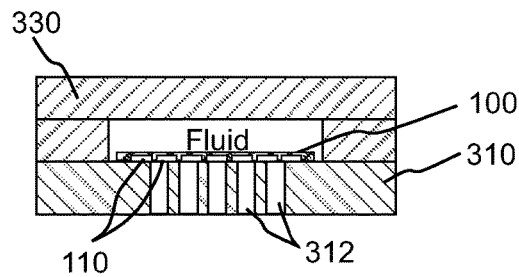
FIG. 4B illustrates a side, cross-sectional view of the microchannel chamber of FIG. 4A.

To test the performance of patterned PDMS membrane 100, a testing device or system 300 was built as illustrated in FIG. 4A. A substrate 310 was made of acrylic plate, with dimensions of 70×35×3 mm³. In substrate 310, 25 through holes 312 (see FIG. 4B) were drilled for breathing, over which PDMS membrane 100 was positioned. The diameter of the holes 312 was 1.5 mm and the spacing was 2 mm. The figures are not drawn to scale. Recesses 110 are, for example, much smaller in diameter than holes 312. To bond PDMS membrane 100 to the perforated acrylic plate/substrate 310, isopropanol was used to prevent thin PDMS membrane 100 from sticking to itself. After the isopropanol was volatilized, PDMS membrane 100 adhered to acrylic plate substrate 310 strongly. In a number of studies, the patterned side (that is, recesses 110) of PDMS membrane 100 faced upward (that is, recesses 110 were on the opposite side from the surface of PDMS membrane 100 contacting acrylic plate substrate 310) and were in direct contact with a fluid in later studies. The other side of PDMS membrane 100 was supported by the perforated plate substrate 310 and was exposed to air via holes 312. Over PDMS membrane 100, a microchannel chamber 330 was formed (see FIG. 3B). The top wall of the microchannel chamber 330 was a 0.5 mm thick rectangular glass piece. The sidewalls of microchannel chamber 330 were formed of PDMS, also having a thickness of about 0.5 mm. The liquid stream was confined within microchannel chamber 330, which had a 14 mm width. An inlet 332 and an outlet 334 were formed by drilling two holes in the top cover glass at the two ends of microchannel chamber 330. Two PTFE tubes 340a and 340b (inner diameter: 0.56 mm), respectively, connected inlet 332 and outlet 334 to a syringe pump 350 (PHD 2000, Harvard Apparatus) and a pH meter 360 (B-713, Horiba Scientific), respectively. The tubes and inlet/outlet were sealed by two custom-made PDMS connectors. On the left side of acrylic plate substrate 310, a 27 mm diameter piezoelectric actuator 370 was attached by using glue.

Figure 5:
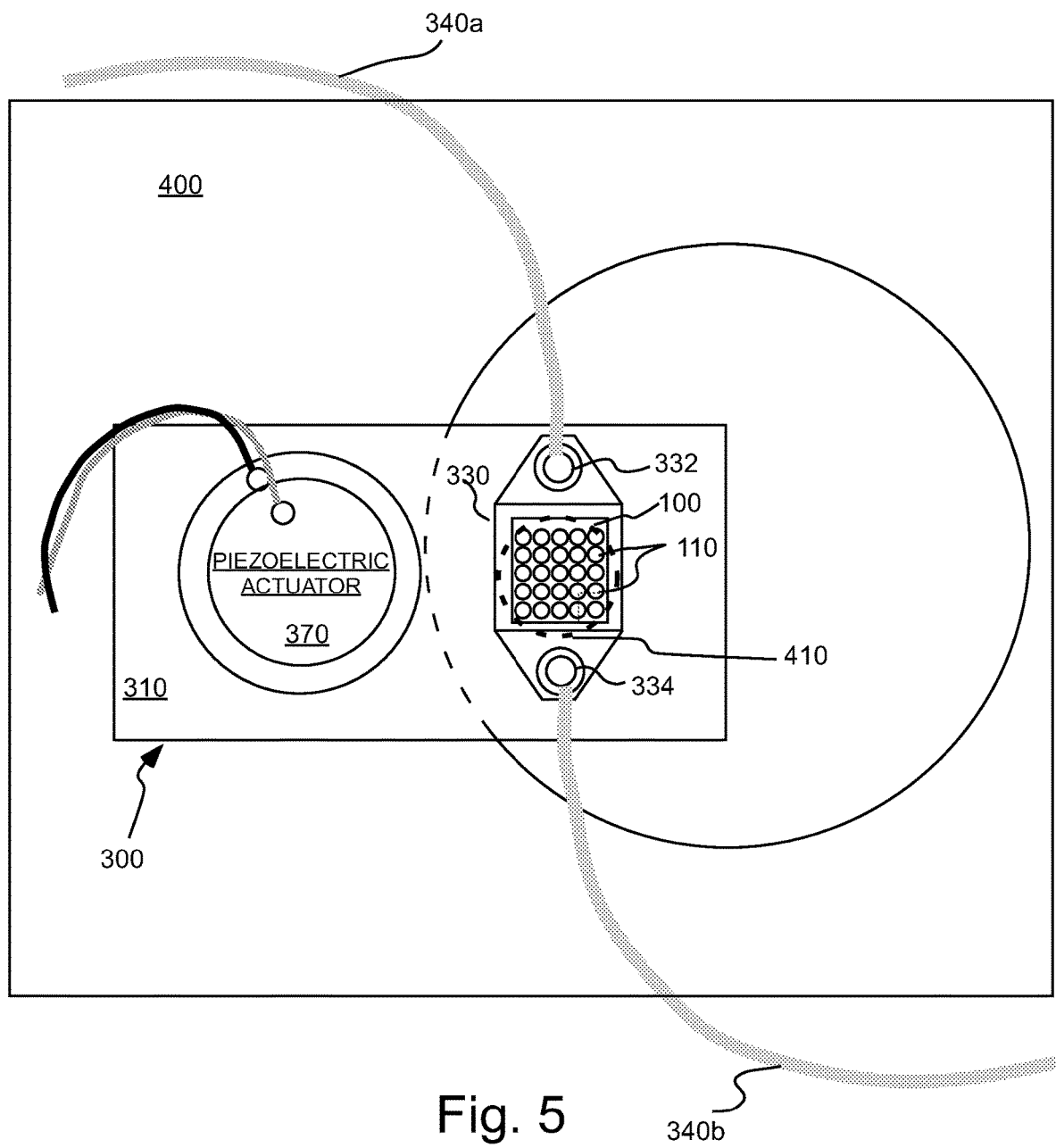
FIG. 5 illustrates the experimental setup of FIG. 4A positioned upon a microscope stage for observation.

To generate an acoustic field, a sinusoidal AC voltage was applied to actuator 370. A function generator (33220 A, Agilent) provided the input signal, which was magnified by an amplifier (PZD 700, Trek). The real input to actuator 370 was measured by a multi-meter (199 C, Fluke). During the experiment, device 300 was anchored on a microscope stage 400 with membrane 300 positioned over a microscope lens 410 (illustrated with a circular dashed line) as illustrated in FIG. 5 for observation. A high-speed camera (V7.3, Phantom) (not shown) was attached to the microscope to record the images of bubble generation and oscillation. In a number of studies, the fluid in microchannel chamber 330 was distilled water saturated by $CO_2$.

Figure 4C:
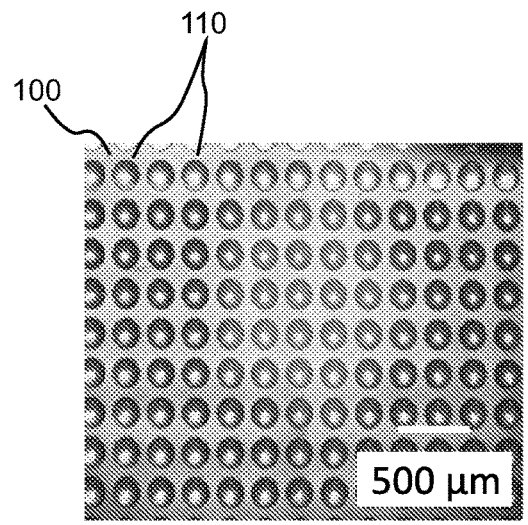
FIG. 4C illustrates a photomicrograph of a membrane hereof used within the experimental setup of FIG. 4A.
Figure 6A:
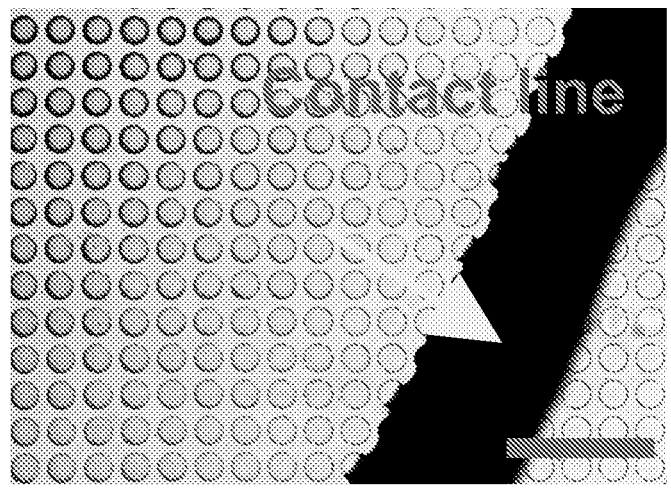
FIG. 6A illustrates a fluid contact line of water passing/flowing over the membrane within the microchannel chamber of FIG. 4A.
Figure 6B:
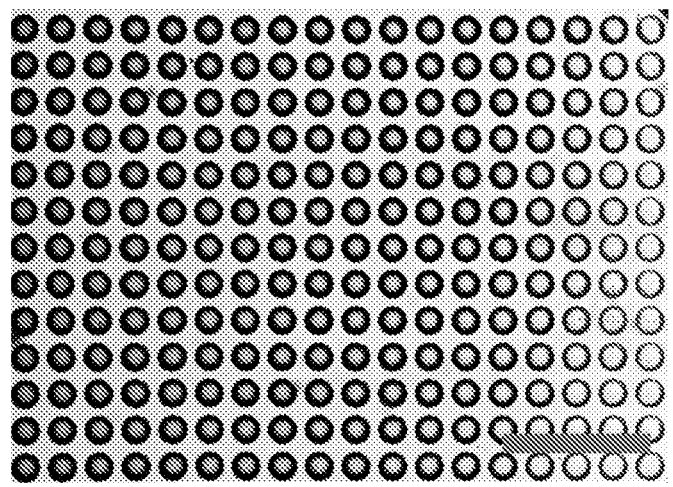
FIG. 6B illustrates air bubbles entrapped upon the recesses of the membrane after water has passed/flown thereover.

When flowing $CO_2$-saturated water into the device, microbubbles are automatically trapped in the micro-recesses as a result of hydrophobicity of the membrane as illustrated in the photomicrograph of FIG. 4C. FIGS. 6A and 6B show the sequentially captured processes as the contact line advances. When the water arrives at the edge of recesses 110, it does not go down to the recess bottom. That is, the contact lines are pinned at the edges, which can be explained by fluid edge pinning effect. Therefore, the water flows around recesses 110, leaving air bubbles in recesses 110. The above process describes one mechanism of via which microbubbles were generated. In FIG. 6A, the fluid direction is from left to right. The black belt indicates the fluid front. Since glass is hydrophilic while PDMS is hydrophobic, the contact line on the glass surface advances earlier than that on the PDMS surface. The left side of the contact line is water with bubbles formed, and the right side is still air. Bubbles with larger curvature reflect more light and become darker, which facilitates observation. After the water sweeps over PDMS membrane 100, the bubbles grow gradually. This process explains why the bubbles far from the contact line appear clearer. After several tens of seconds, the sizes of bubbles become stable, as illustrated in FIG. 6B. Large bubbles may occasionally result in mergence between bubbles. The resonance frequencies may change significantly with varying bubbles sizes. In practice, one constant frequency is desirable for experimentation. Therefore, it was desirable to maintain the bubble size as constant as possible. Although the diameter is 200 µm for all bubbles at any time, the curvatures of the bubbles vary under different conditions.

In a number of embodiments hereof, the membranes hereof are designed to have a liquid including a gas component therein to be flown thereof (or therethrough in the case of a hollow fiber), wherein the gas component is transportable through the membrane but the aqueous liquid is substantially not mobile therethrough at pressures generally experienced in the devices, systems and methods hereof. In the case of an aqueous liquid such as blood, the membrane may, for example, be hydrophobic as described above. In the case of a non-aqueous or organic fluid, the membrane may, for example, be oleophobic. As used herein, the term oleophobic refers generally to a membrane through which a gas component is mobile but through which non-aqueous liquids are substantially immobile. Such oleophobic membranes are substantially resistant to bulk flow of low-surface tension liquids (non-aqueous liquids) therethrough at internal pressures generally experienced in the devices systems and methods hereof. As used herein, the phrase "low-surface tension liquids" refers generally to liquids having a surface tension less than that of water. Oleophobic membranes may also be hydrophobic (that is, they are also substantially resistant to the bulk flow of water/aqueous liquids therethrough at internal pressures generally experienced in the devices systems and method hereof). Membranes that are both hydrophobic and oleophobic are referred to as multiphobic. Bubble of the gas in the environment surrounding the membrane may be entrapped in the recesses thereof by flowing the fluid thereover as described above.

Since the pressure on the backside of membrane 100 is constant (atmospheric), adjusting the liquid pressure is one choice to control the bubble size. A height H was defined as the height from microscope stage 400 to the highest point of outlet tube 340b. Inlet tube 340a was static, while outlet tube 340b could be raised or lowered. The highest point of outlet tube 340b determines the pressure inside chamber 330. The flow rate was set to be 0.2 mL/min. When H was 7.7 cm, it was found that the bubbles grew slowly. However, when H was 15 cm, the bubbles shrank and finally collapsed. The added hydrostatic pressure, as determined by height H, can be estimated by using the equation $\Delta p = \rho g H = 715.4$ Pa, where $\rho$ is the density of the fluid and g is gravitational acceleration. Therefore, the bubble size is sensitive to the fluid pressure. At a certain readily determinable pressure, a constant bubble size is achievable and can be maintained during the following experimentation.

Once the bubble size is stabilized, the frequency at which oscillation amplitude of the bubble array is the largest can be found by sweeping the frequency while the input voltage remains constant. In a number of studies hereof, the resonance frequency was found to be approximately 17.6 kHz. FIGS. 7A and 7B show the bubble surfaces without and with oscillation, respectively. Different oscillation modes may be observed on the bubble surfaces (FIG. 7B). At the studied frequency of 17.6 kHz, waves exist on the bubble surface. The bubbles expand and shrink, generating asymmetric flows between those two stages. Overall, the net flow is a quasi-steady microstreaming flow. Such a flow may be used to mix the fluid and improve the efficiency of dissolved gas removal from the fluid. In FIG. 7C, a bubble array is formed on the surface of PDMS membrane 100. In the studies of FIGS. 7C and 7D, 2 μm particles were seeded in the water for flow visualization, most of which fell onto PDMS membrane 100. The water in the studies of FIGS. 7C and 7D is stationary to better demonstrate the effect of microstreaming flow. FIG. 7D shows that, even at 10 V input to the piezo-actuator, the streaming flow generated can laterally move the particles to 0.5 mm away from membrane 100 within 10 sec. Four main streaks of streaming flows are observed in FIG. 7D to be formed by the moving particle clusters, and the streaming flow front is also clearly observable. When the input voltage is increased, the particles move more quickly with increasing voltage as a result of larger bubble oscillation amplitude. With strong microstreaming flow, the water is substantially disturbed. The disturbance can reach millimeter scales or further, which can be very beneficial for mixing and/or mass transport in microfluidic flow.

Figure 8:
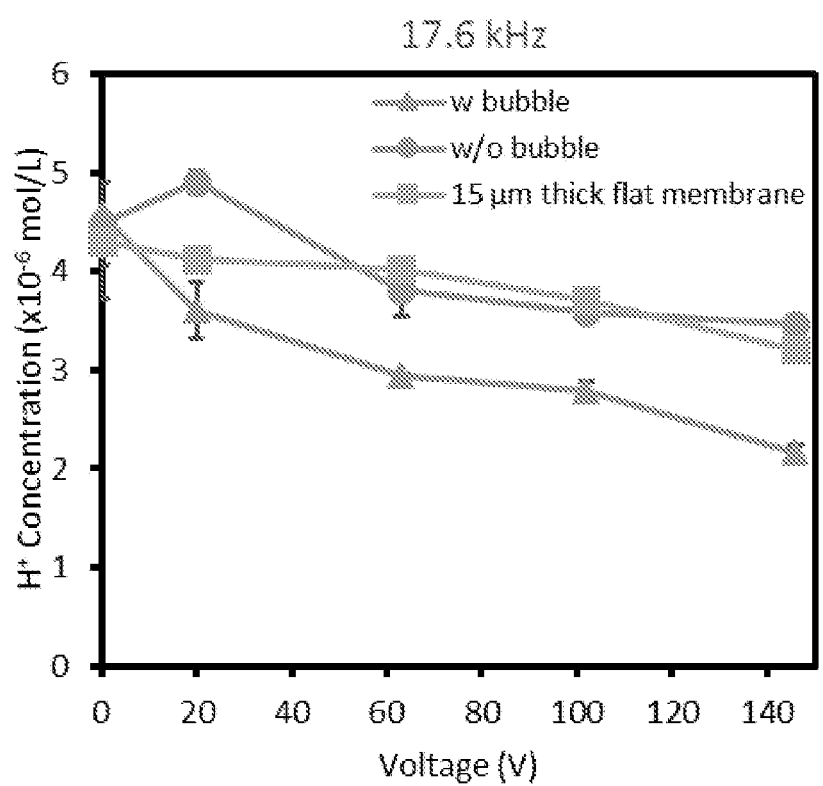
FIG. 8 illustrates a graph of the results of a study of $CO_2$ removal from water including solubilized $CO_2$ for oscillation of a recessed membrane with and without bubbled entrapped thereof and for oscillation of a thinner, flat membrane.

Because the concentration of $CO_2$ is proportional to pH in water, the $H^+$ concentration (pH) can be used as an indicator for $CO_2$ removal. As illustrated in the studies of FIG. 8, as the oscillation amplitude (voltage input) increases, the $H^+$ concentration decreases more quickly (that is, $CO_2$ is removed into air more quickly). In the studies of FIG. 8, two measurements were made at each voltage. The device running time was 1.5 min for each measurement, and the initial $H^+$ concentration at the inlet was $7.4 \times 10^{-6}$ mol/L. This trend is most prominent (about 2 times decreasing in $H^+$ concentration compared to no oscillation) when bubbles are installed in membrane recesses. As for the case without bubbles, $CO_2$ removal is also improved by increasing the voltage. This is mainly due to the vibration of the membrane, affecting the laminar boundary layer. The performance of the patterned PDMS membrane with bubbles is best among the tested cases, even better than the thinner flat membrane (having a thickness of 15 μm). Note that 0 V means no oscillation.

Figure 9:
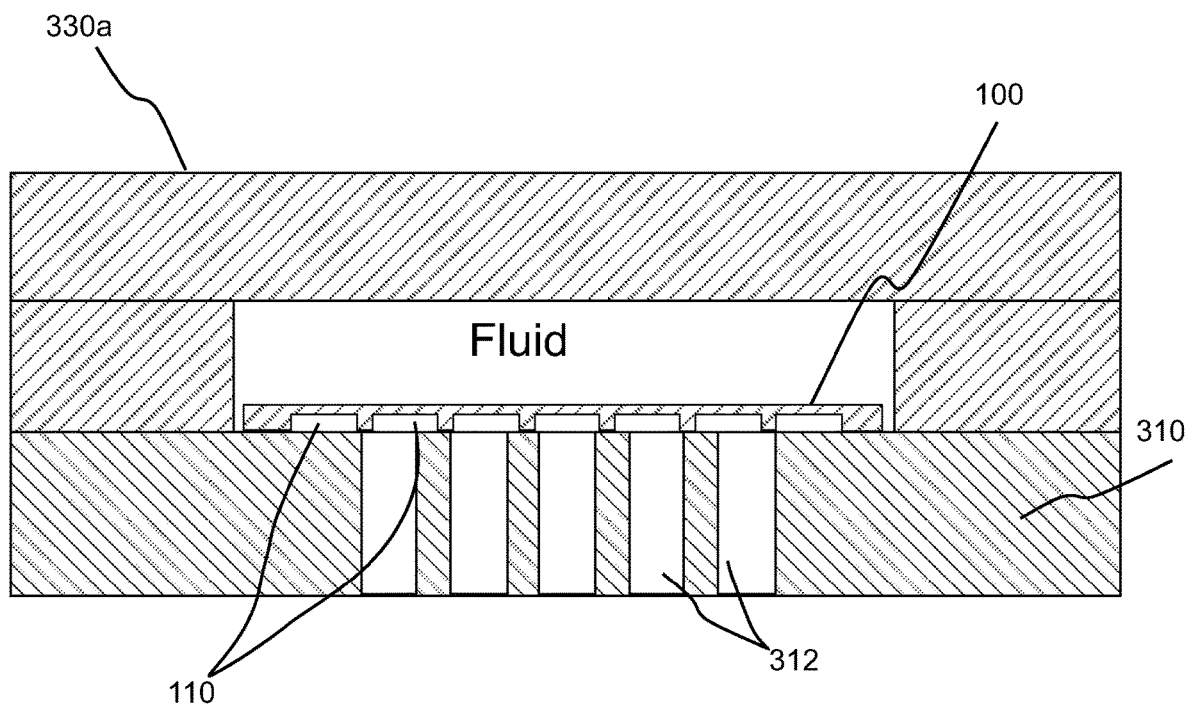
FIG. 9 illustrated an embodiment of a microchannel hereof for oscillation of a recessed membrane without entrapment of bubbles thereof wherein the flat surface of the membrane contacts the fluid.

In certain circumstances, it may be undesirable to have direct contact between a gas bubble and the fluid. For example, direct contact between air bubbles and blood can cause problems in certain circumstances. Although recesses 110 in membrane 100 are described above as facilitating and trapping gas (for example, air) bubbles, structures or patterns such as recesses may also be used to form areas within a membrane of reduced thickness which can facilitate oscillation (and thereby microstreaming in the adjacent fluid). For example, FIG. 9 illustrates microchannel chamber 330*a* wherein the orientation of membrane 100 is flipped vertically. In that regard, recesses 110 are facing perforated acrylic substrates 310, while the flat surface of membrane (opposite recesses 110) are in contact with the liquid flow.

Although providing a very thin, flat membrane (that is, without, for example, recesses) can enhance oscillation of the membrane, very thin membranes present a number of problems. It that regard, very thin membranes are difficult to handle because they are easily damaged (for example, torn). Moreover, oscillation is influenced by how the membrane contacts with any supporting structures. It is difficult to control the oscillation behavior in a very thin membrane. By using a somewhat thicker membrane with areas of reduced thickness (for example, an array of recesses), the above problems are lessened or eliminated, while maintaining a similar or approximately the same mass transport rate as provided by a thinner, flat membrane.

The devices, systems and methods hereof provide for oscillation of a gas permeable membrane, which can generate microstreaming in the cross-stream direction to disrupt a laminar boundary layer in, for example, microfluidics. For example, a polymeric membrane including micro-recesses or depressions (that is, areas of reduce thickness) may be used to trap microbubbles on the membrane and/or to enhance oscillation. When a fluid flows over the membrane, micro-bubbles may, for example, be trapped automatically. Such trapped micro-bubbles may function as actuators to generate microstreaming flows under influence of an acoustic field. Control of bubble size may be used to obtain the constant resonance frequency. In the absence of micro-bubbles, oscillation of the membrane itself can produce microstreaming in a cross-stream direction. Microstreaming flow can mix the main stream strongly, resulting in the augmentation of gas exchange across the stream. In a number of representative studies, $CO_2$ dissolved in water was used as an indicator to quantify gas exchange. $CO_2$ removal is readily measured by, for example, measuring pH change. The oscillating membranes hereof may be used to markedly improve the performance of gas exchange in artificial lungs, or other gas exchangers.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A system, comprising: a device comprising
a liquid inlet;
a liquid outlet;
a first volume in fluid connection with the liquid inlet and the liquid outlet for flow of a liquid through the first volume;
a gas inlet;
a gas outlet;
one or more second volumes in fluid connection with the gas inlet and the gas outlet for flow of a gas through the one or more second volumes;
each one of the one or more second volumes independently having a membrane associated therewith which separates the first volume from the one of the one or more second volumes associated with the membrane, each membrane having a thickness in the range of 1 μm to 50 μm and comprising a plurality of areas formed in an array over an area of the membrane on a side of the membrane contacting the first volume, each of the areas having a reduced thickness in the range of 1 um to 10 um, each membrane being gas permeable to transport at least one gaseous component therethrough while limiting or preventing the transport of liquid through the membrane, each area of the plurality of areas being configured to entrap and retain gas bubbles therein such that the entrapped gas bubbles are in contact with the first volume, and an actuator configured to induce oscillation in each membrane, the liquid inlet being in fluid connection with a source of the liquid wherein the gas bubbles are formed and entrapped upon the plurality of areas during priming of device with the liquid, wherein a frequency of oscillation induced in each membrane via the actuator is selected to induce oscillation in surfaces of all of the gas bubbles when present after priming, the frequency of oscillation induced in each membrane further being selected to be at least 500 Hz and to be in a range to maintain stability in the gas bubbles when present after priming, whereby mass flow in a laminar flow region of the first volume in the vicinity of a surface of the side of each membrane contacting the first volume is increased via streaming flow induced by oscillation of the gas bubbles when present after priming.

2. The system of claim 1 wherein the actuator is configured to induce oscillation at a frequency of at least 1 kHz.

3. The system of claim 1 wherein the actuator is configured to induce oscillation at a frequency of at least 5 kHz.

4. The system of claim 1 wherein each of the plurality of areas comprises a hydrophobic surface, an oleophobic surface, or a multiphobic surface.

5. The system of claim 4 wherein each of the plurality of areas comprises a hydrophobic surface.

6. The system of claim 1 wherein each membrane is a polymeric membrane.

7. The system of claim 1 wherein each membrane has a thickness in the range of 1 µm to 25 µm, and each of the plurality of areas has a thickness in the range of 1 µm to 7.5 µm.

8. The system of claim 1 wherein the actuator is configured to induce oscillation at a frequency of at least 10 KHz.

9. The system of claim 1 wherein the actuator is configured to induce resonance in the surfaces of all the gas bubbles while maintaining stability in the gas bubbles.

10. The system of claim 1 wherein each membrane comprises polypropylene, polysiloxane or polydimethylsiloxane.

11. The system of claim 1 wherein the at least one gaseous component is carbon dioxide and the liquid comprises blood, the carbon dioxide transporting across each membrane from the liquid into the gas.

12. The system of claim 11 wherein the device is an artificial lung.

13. The system of 1 wherein the device is an artificial lung, a dialyzer, a membrane filter system, or a heat exchanger system.

14. The system of claim 12 wherein the device comprises a plurality of the second volumes, wherein each one of the plurality of second volumes independently has a membrane associated therewith which separates the first volume from each one of the plurality of second volumes associated with the membrane.

15. The system of claim 14 wherein each membrane is formed as a hollow fiber around the one of the plurality of second volumes associated with the membrane.

16. A method of exchanging at least one gas component between a liquid and a gas, comprising:

providing a device comprising
a liquid inlet;
a liquid outlet;
a first volume in fluid connection with the liquid inlet and the liquid outlet for flow of a liquid through the first volume;
a gas inlet;
a gas outlet;
one or more second volumes in fluid connection with the gas inlet and the gas outlet for flow of a gas through the one or more second volumes;
each one of the one or more second volumes independently having a membrane associated therewith which separates the first volume from the one of the one or more second volumes associated with the membrane, each membrane having a thickness in the range of 1 µm to 50 µm and comprising a plurality of areas formed in an array over an area of the membrane on a side of the membrane contacting the first volume, each of the areas having a reduced thickness in the range of 1 µm to 10 µm, each membrane being gas permeable to transport at least one gaseous component therethrough while limiting or preventing the transport of liquid through the membrane, each area of the plurality of areas being configured to entrap and retain gas bubbles therein such that the entrapped gas bubbles are in contact with the first volume, and
an actuator configured to induce oscillation in each membrane, flowing the liquid through a the first volume via the liquid inlet, which is in fluid connection with a source of the liquid, wherein the gas bubbles are formed and entrapped upon the plurality of areas during priming of the device with the liquid;

flowing the gas through the one or more second volumes via the gas inlet, and oscillating each membrane via the actuator at a frequency selected to induce oscillation in surfaces of all of the gas bubbles when present after priming, wherein the frequency of oscillation induced in each membrane, is further selected to be at least 500 Hz and to be within a range of frequencies to maintain stability in the gas bubbles where present after priming, whereby mass flow in a laminar flow region of the first volume in the vicinity of a surface of the side of the membrane contacting the first volume is increased via streaming flow induced by oscillation of the gas bubbles when present after priming.

17. The method of claim 16 wherein the gas bubbles are oscillated at a frequency of at least 1 kHz.

18. The method of claim 16 wherein the gas bubbles are oscillated at a frequency of at least 5 kHz.

19. The method of claim 7 wherein each of the plurality of areas comprises a hydrophobic surface, an oleophobic surface, or a multiphobic surface.

20. The method of claim 19 wherein each of the plurality of areas comprises a hydrophobic surface.

21. The method of claim 16 wherein each membrane of the membranes is a polymeric membrane.

22. The method of claim 16 wherein the gas bubbles are oscillated at a frequency of at least 10 kHz.

23. The method of claim 16 wherein each membrane of the membranes comprises polypropylene, polysiloxane or polydimethylsiloxane.

24. The method of claim 16 wherein resonance is induced in the surfaces of the gas bubbles while maintaining stability in the gas bubbles.

25. The method of claim 16 wherein the at least one gaseous component is carbon dioxide and the liquid comprises blood, the carbon dioxide transporting across each membrane of the membranes from the liquid into the gas.

26. The method of claim 25 wherein the method further comprises flowing the gas, which comprises oxygen, through each of the one or more second volumes.

* * * * *